March 12, 1940.  G. A. LYON  2,193,104
WHEEL COVER
Original Filed July 16, 1936  2 Sheets-Sheet 1
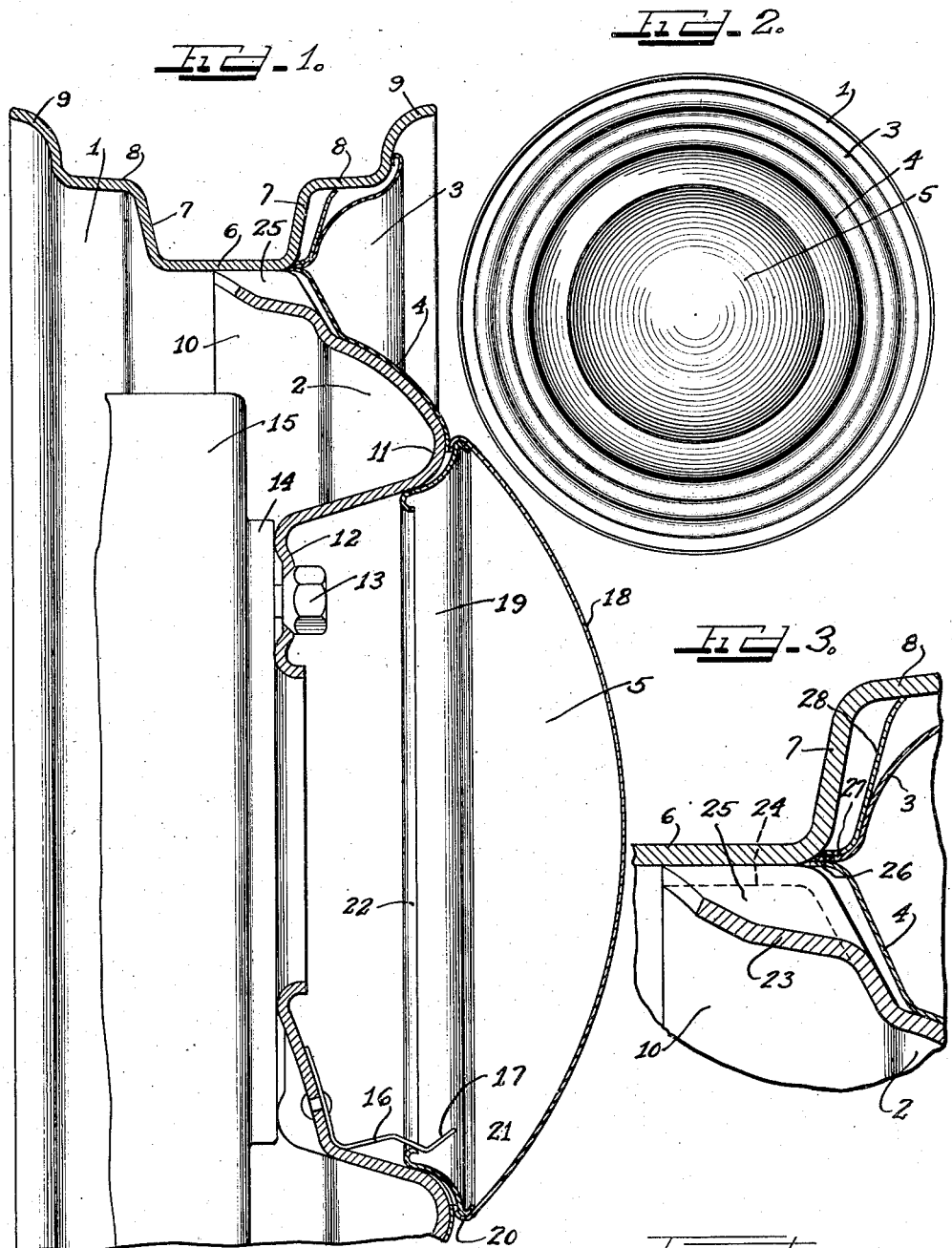
Inventor
GEORGE ALBERT LYON.

Inventor
George Albert Lyon

Patented Mar. 12, 1940

2,193,104

UNITED STATES PATENT OFFICE 2,193,104

WHEEL COVER

George Albert Lyon, Allenhurst, N. J.

Application July 16, 1936, Serial No. 90,904
Renewed June 26, 1939

11 Claims. (Cl. 301—37)

This invention relates to an ornamental article and a process of making the same, and more particularly to a novel ornamental member adapted for disposition over an outer surface of a vehicle wheel and to a novel process of making such an article.

In the manufacture of vehicle wheels, it is often desirable to cover or partially cover the outer surface of a wheel with an ornamental member which will enhance its general appearance and render the same more pleasing to the eye. Since the average vehicle, particularly an automotive vehicle, is inherently costly and since competition is extremely keen, it is important that the manufacturing costs of any ornamental members be kept as low as possible, and at the same time maintain high standards of manufacturing quality.

It is an object of my invention to provide a novel ornamental member for vehicle wheels which is extremely pleasing to the eye, which is economical to manufacture, and which is rugged and reliable in use.

It is a further object of my invention to provide a novel process for manufacturing an ornamental article of the type just referred to.

It is a further object of this invention to provide a novel process for making an ornamental trim ring, an ornamental disk, and an auxiliary ornamental article from a single blanking and cutting operation.

Another object of this invention is to provide an improved simplified process of manufacturing the various component parts of an ornamental wheel assembly.

Another and further object of my invention is to provide a novel form of ornamental member adapted for disposition over an outer side surface of a vehicle wheel which includes an ornamental disk, an ornamental trim ring, and a plurality of retaining fingers for mounting the member on a vehicle wheel which are firmly secured to the member at the junction point of the ornamental disk and the ornamental trim ring.

The novel features which I believe to be characteristic of my invention are set forth with particularity in the appended claims. My invention itself, however, both as to its construction and to its process of manufacture, together with further objects and advantages thereof, may best be understood by reference to the following description taken in connection with the accompanying drawings, in which:

Figure 1 is an elevational view, partly in cross-section, of a vehicle wheel and ornamental member embodying the features of this invention, and showing the manner in which the ornamental member is retained in position over an outer surface of the wheel by a plurality of retaining fingers carried by the ornamental member;

Figure 2 is a side view of a vehicle wheel having an ornamental trim ring, an ornamental disk and a hub cap disposed over its outer surface;

Figure 3 is an enlarged view of the upper right-hand corner of Figure 1, showing the junction point of the ornamental trim ring with the ornamental disk together with the member retaining fingers;

Figure 4:
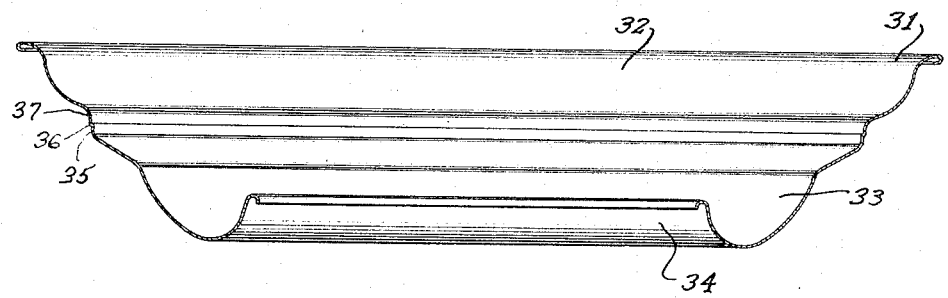
Figure 4 is a view illustrating the first step in the process of making a group of elements for an ornamental assembly, namely, the step of blanking or drawing the ornamental trim ring, the ornamental disk and the auxiliary ornamental article from a single metallic sheet.

Referring to Figure 1 of the drawings, the vehicle wheel and ornamental assembly shown therein include in general a rim 1, a wheel body part 2, an ornamental trim ring 3, an ornamental disk 4, and a hub cap 5. The rim 1 is of the usual drop center type and includes the base flange 6, opposite side flanges 7, opposite intermediate flanges 8 and opposite edge portions 9. It will, of course, be understood that the wheel in its complete operative form includes a pneumatic tire or the like (not shown), the tire being disposed over the rim 1 and seated on the opposite intermediate flanges 8.

The wheel body part 2 includes an axial inwardly extending flange 10 at its outer periphery, to which the base flange 6 of the rim 1 is secured in any suitable manner (not shown). Although the flange 10 may assume any of a wide variety of forms, I have illustrated it here as being provided with a series of depressed portions 23 which are substantially equally spaced circumferentially about the flange. These depressed portions 23, as may be seen from the drawings, are continuous with the main part 24 of the flange, and consequently form an annular series of axial passageways 25 through the wheel. If the normal free circulation of air about the inner side of the wheel is not sufficient to adequately cool the brake drum 15 and its associated elements, a series of apertures (not shown) may be made in the ornamental disk 4 opposite the outer ends of the passageways 25. Additional cooling air will then circulate through the passageways 25 to further cool the brake drum 15.

The wheel body part 2 near the center of the wheel is bent abruptly axially inwardly to form a shoulder 11 and then abruptly radially inwardly to form a circular holding flange 12. The circular holding flange 12 is provided with a plurality of apertures through which the usual wheel bolts 13 are adapted to be inserted. The wheel bolts 13 are carried on the wheel mounting element 14 of the brake drum 15.

Secured to the circular holding flange 12 are a plurality of hub cap retaining spring elements 16. Each spring element includes an outwardly extending leg which terminates in a hook-like end 17, which is resilient and is adapted to have the hub cap 5 snapped into engagement therewith for securing the hub cap in place.

The hub cap 5 comprises a hollow shell 18 and an inwardly turned skirt 19, shaped to engage against the shoulder 11 of the wheel body part 2. Upon close inspection of the drawings, it will be observed that the outer marginal edge of the shell 18 is curled about the similarly curled outer marginal edge 21 of the skirt 19. The shell 18 is secured to the skirt 19 in any suitable manner at overlapped portions, such as by welding or the like. The skirt 19 is provided with a turned inner edge 22 over which the hook-like ends 17 of the spring elements 16 are adapted to slide as the hub cap is forced axially into retaining engagement with the spring elements.

Figure 7:
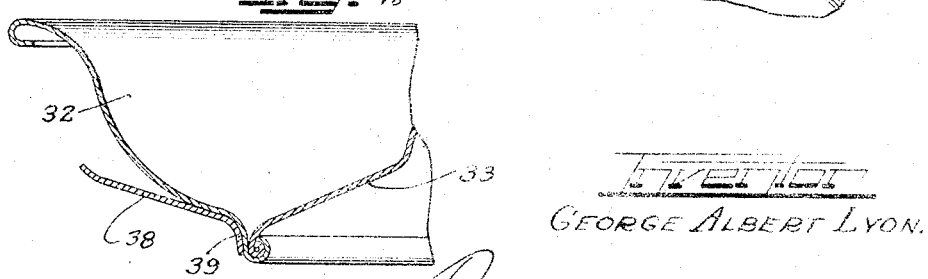
Figure 7 is an enlarged fragmentary view of the ornamental member, showing particularly how the inner edge of the ornamental trim ring may be rolled about the outer edge of the ornamental disk to secure them firmly together.

As may be seen in Figures 1 and 3 of the drawings, the ornamental member which is adapted for disposition over an outer side surface of the vehicle wheel includes an ornamental disk 4 having an axially inwardly extending outer edge 26, and an ornamental trim ring 3 having an axially inwardly extending inner edge 27. The edges 26 and 27 lie in intimate contact with each other and may be secured together in any suitable manner, such as by welding, as is indicated in Figure 3 of the drawings, or they may be secured together by curling one edge about the other, as is indicated in Figure 7 of the drawings. In order to provide a means for securely mounting the ornamental member to the vehicle wheel, a plurality of fastening or mounting fingers 28 are secured to the marginal edge 27 of the trim ring 3, in the manner indicated in the drawings. The fingers 28 are substantially equally spaced circumferentially about the marginal edge 27 and extend radially and slightly outwardly into engagement with the outer intermediate flange 8 of the rim 1. It will readily be understood that as the ornamental member is moved axially into engagement with the vehicle wheel, the fingers 28 make biting engagement with the intermediate flange 8 of the rim 1. Any tendency thereafter for the ornamental member to move axially outwardly only causes the fingers 28 to bite deeper into the rim 1. After the ornamental member has been assembled on the wheel, the hub cap 5 is snapped into engagement with the resilient spring elements 16. Inasmuch as the inner marginal edge of the ornamental disk 4 slightly underlies the curled marginal edge 20 of the hub cap 5, the ornamental member is also held in position by the hub cap. Although the ornamental trim ring 3 and the ornamental disk 4 have been illustrated with such relative dimensions as will place the marginal edges 26 and 27 respectively at the junction point of the rim 1 and body part 2, I do not wish to be limited to such a relationship, since these relative dimensions may be varied through wide limits without departing from the spirit and scope of my invention. The relationship shown, however, is preferable from a manufacturing standpoint, since when the edges 26 and 27 are so positioned as to lie in the crevice formed by the rim 1 and the body part 2, the whole mounting is more rugged and less apt to vibrate when the wheel is in motion.

The novel process of manufacturing my ornamental assembly of members will now be described in detail, reference being had to Figures 4, 5, 6 and 7 of the drawings.

The reference character 31 designates generally a sheet of suitable material, such, for example, as a metallic sheet, from which the various component parts of my ornamental assembly of members are fabricated. It is believed that my process of manufacture can readily be understood from a description of the component parts and the manner in which they are formed and assembled.

The metallic sheet is held in a suitable press or other equipment, and may be either square or round, as desired. This sheet is then subjected to a pressing or blanking operation whereby an annulus is formed or depressed therefrom having a cross-sectional configuration as shown in Figure 4. The annulus is so formed that subsequently three annuli 32, 33 and 34, respectively, may be obtained therefrom. The annuli 32 and 33 are connected by an intermediate annular rib 35 having an inclined edge 36 which reduces the diameter of the outer edge of the annulus 33 to enable the same to be nested in the annulus 32 after the three annuli have been severed one from the other and its position reversed with respect thereto.

Figure 5:
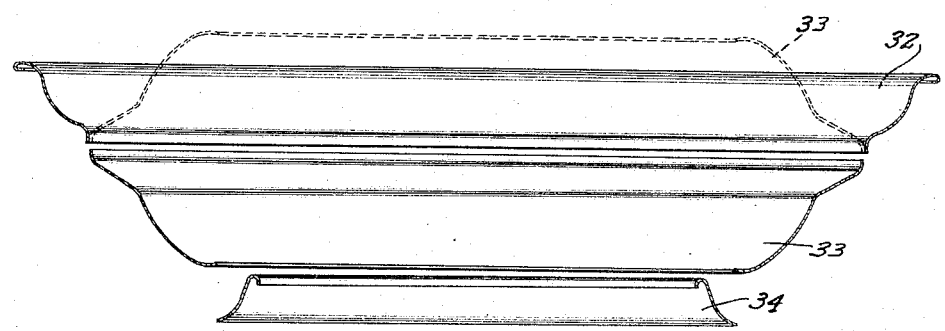
Figure 5 is a view illustrating other steps of the process, and more particularly the steps of severing the parts and nesting the middle annulus in the outer annulus, the middle annulus in its reverse position being shown in dotted lines.

In Figure 5, the annuli 32, 33 and 34 are shown after their severing operation. The central annulus is then reversed in position with reference to the outer annulus, or in other words, is disposed in the dotted line position shown in Figure 5. In this position, the outer marginal edge 35 of the annulus 33 is nested inside the inner marginal edge 37 of the annulus 32. The annuli 32 and 33 may then be either welded together at their abutting marginal edges, or they may be nested together in the manner shown in Figure 7. When a press operation is used to effect the interconnection of edges shown in Figure 7, the edge 37 is forced to follow a curved path in a suitable die so that it is curled upwardly about and around the edge 35 as the annulus 32 is pressed into position about the annulus 33, provision being made in the die for this operation by an annular groove having a shape and diameter corresponding to that of the rolled edge desired.

The annuli 32 and 33, as thus formed and secured together, constitute an ornamental member which is adapted for disposition over an outer side surface of a vehicle wheel, the annulus 32 being the ornamental trim ring and the annulus 33 being the ornamental disk. This two-part ornamental member lends itself admirably to the formation of color contrast. For example, the trim ring 32 could be finished in one color and the disk 33 could have a lustrous finish, such as is obtained by chromium plating. After the parts have been thus finished, they can be assembled and interconnected in a press or by a welding operation, as previously described. In making this inter-connection in a press, chamois-covered die parts can be employed so as to prevent marring surfaces.

The inner annulus 34 which is blanked and cut from the metallic sheet 31 may be used for any suitable purpose. Ornamental circular articles are used in a wide variety of places. By thus forming an auxiliary ornamental article from the metallic sheet 31, a minimum amount of scrap material is left, and the auxiliary article may be blanked from the single pressing operation which forms the two ornamental wheel units. This results in a further saving in manufacturing costs.

Figure 6:
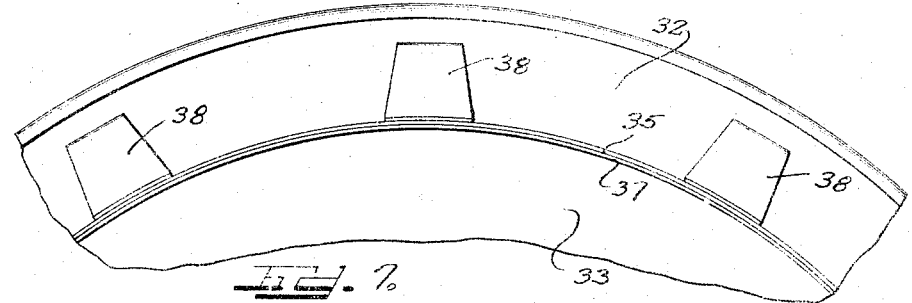
Figure 6 is a fragmentary side view of the ornamental member showing more clearly the position of the retaining fingers thereon.

Figures 6 and 7 show a number of fastening or mounting fingers 38 secured to the inner marginal edge of the ornamental ring 32. These fingers may be welded or otherwise suitably secured at their inner ends 39 to the ring 32.

From the foregoing description, it will be apparent that I have provided a novel and improved ornamental assembly of members and method of manufacturing the same. As will be understood by those skilled in the art, the process of manufacturing the various component parts and of assembling them is extremely economical. Furthermore, the resulting ornamental assembly of members is highly pleasing to the eye, yet rugged and reliable in use.

Of course, it is to be understood that while I have described the interconnections of the edges as being effected in a press, the curling and rolling operations could be carried out by other equipment, such, for example, as by rolls so arranged as to curl an edge of one part about an edge of the other. The performance of this step in a press, however, particularly where the disks are being made on a production basis, would be cheaper than rolling the edges together by separate equipment. Where the disk is produced on a jobbing basis, the process of my invention could, of course, be carried out by a spinning operation.

While I have shown a particular embodiment of my invention, it will, of course, be understood that I do not wish to be limited thereto, since many other modifications may be made, and I therefore contemplate by the appended claims to cover all such modifications as fall within the true spirit and scope of my invention.

I claim as my invention:

1. As an article of manufacture, an ornamental member adapted for disposition over an outer side surface of a vehicle wheel comprising an ornamental disk having an axially inwardly extending outer edge, an ornamental trim ring having an axially inwardly extending inner edge which lies in intimate contact with and is secured to the outer edge of said disk, and means including a plurality of fingers secured to said ring at the junction point of said ring and disk which are adapted to secure said member to a vehicle wheel.

2. As an article of manufacture, an ornamental member adapted for disposition over an outer side surface of a vehicle wheel comprising an ornamental disk having an axially inwardly extending outer edge, an ornamental trim ring having an axially inwardly extending inner edge which lies in intimate contact with and is secured to the outer edge of said disk by a rolled interlocking engagement therewith, and means including a plurality of fingers secured to said ring at the junction point of said ring and disk which are adapted to secure said member in its desired assembled position on a vehicle wheel.

3. As an article of manufacture, an ornamental member adapted for disposition over an outer side surface of a vehicle wheel comprising an ornamental disk having an axially inwardly extending outer edge, an ornamental trim ring having an axially inwardly extending inner edge which lies in intimate contact with and is secured to the outer edge of said disk, and a plurality of radially and slightly outwardly extending fingers firmly secured to said ring in proximity to said abutting edges which are adapted to make a biting engagement with a vehicle wheel when said member is assembled thereon, thereby to retain said member in its assembled position on said wheel.

4. As an article of manufacture, an ornamental member adapted for disposition over an outer side surface of a vehicle wheel comprising an ornamental disk having an axially inwardly extending outer edge, an ornamental trim ring having an axially inwardly extending inner edge which lies in intimate contact with and is secured to the outer edge of said disk, and a plurality of fastening fingers firmly secured to said member in proximity to said abutting edges which are adapted to retain said member in its desired assembled position on a vehicle wheel.

5. In combination with a wheel having rim and body parts firmly secured together, said rim and body parts forming a crevice at their junction point on the outer side of the wheel, an ornamental member having an intermediate axially inwardly extending ledge, the axial inner edge of said ledge being disposed in said crevice, and means for securing said member to said wheel.

6. In combination with a wheel having rim and body parts firmly secured together, said rim and body parts forming a crevice at their junction point on the outer side of the wheel, an ornamental member having an intermediate axially inwardly extending ledge, the axial inner edge of said ledge being disposed in said crevice, and a plurality of radially and slightly outwardly extending fingers circumferentially disposed about said ledge and secured thereto, the outer ends of said fingers making a biting engagement with the rim part of said wheel, whereby said ornamental member is firmly secured to said wheel.

7. In combination with a wheel having rim and body parts firmly secured together, said rim and body parts forming a crevice at their junction point on the outer side of the wheel, an ornamental disk having an axially inwardly extending outer edge, an ornamental trim ring having an axially inwardly extending inner edge which lies in intimate contact with and is secured to the axial inner edge of said disk, the axial inner portion of said axially extending edges being disposed in said crevice, and means for securing said trim ring and said disk to said wheel.

8. In combination with a wheel having rim and body parts firmly secured together, said rim and body parts forming a crevice at their junction point on the outer side of the wheel, an ornamental disk having an axially inwardly extending outer edge, an ornamental trim ring having an axially inwardly extending inner edge which lies in intimate contact with and is secured to the axial inner edge of said disk, the axial inner portion of said axially extending edges being disposed in said crevice, and a plurality of radially and slightly outwardly extending fingers secured to the axially inwardly extending inner edge of said trim ring which are adapted to make a biting engagement with said vehicle wheel when said trim ring and said disk are assembled thereon, thereby to retain said trim ring and said disk in their assembled position on said wheel.

9. The combination with a wheel including a tire rim part having a base flange and side flanges and an inner wheel mounting part connected to said base flange, of an ornamental circular member for disposition on said wheel, having an outer marginal portion formed to bear against a side flange of said rim part and having a concealed rearwardly extending intermediate annular edge disposed adjacent the junction of said wheel parts and provided with means for resiliently gripping one of said parts to retain said member on the wheel.

10. The combination with a wheel including a tire rim part having a base flange and side flanges and an inner wheel mounting part connected to said base flange, of an ornamental circular member for disposition on said wheel, having an outer marginal portion formed to bear against a side flange of said rim part and having a concealed rearwardly extending intermediate annular edge disposed adjacent the junction of said wheel parts and provided with means for resiliently gripping one of said parts to retain said member on the wheel, said edge comprising a shoulder of a double thickness of material formed from an annular intermediate portion of said member.

11. The combination with a wheel including a tire rim part having a base flange and side flanges and an inner wheel mounting part connected to said base flange, of an ornamental circular member for disposition on said wheel, having an outer marginal portion formed to bear against a side flange of said rim part and having a concealed rearwardly extending intermediate annular edge disposed adjacent the junction of said wheel parts and provided with means for resiliently gripping one of said parts to retain said member on the wheel, said means including a plurality of spaced resilient fingers placed under stress by the pressing of the member in an axial direction against the wheel.

GEORGE ALBERT LYON.